J. H. WARNER.
BOLT.
APPLICATION FILED JULY 22, 1918.

1,291,303.

Patented Jan. 14, 1919.

Witnesses
R. A. Thomas

Inventor
J. H. Warner
By Victor J. Evans
Attorney

UNITED STATES PATENT OFFICE.

JOSHUA H. WARNER, OF VICTORIA, BRITISH COLUMBIA, CANADA.

BOLT.

1,291,303.

Specification of Letters Patent. Patented Jan. 14, 1919.

Application filed July 22, 1918. Serial No. 246,060.

*To all whom it may concern:*

Be it known that I, JOSHUA H. WARNER, a subject of the King of Great Britain, residing at Victoria, in the Province of British Columbia and Dominion of Canada, have invented new and useful Improvements in Bolts, of which the following is a specification.

This invention relates to improvements in means for repairing boilers, tanks or other receptacles, the object being to provide a patch of cheap and simple construction which may be easily and quickly adjusted in position for the purpose of stopping a leak.

To this end the invention includes a washer or washers of elongated shape and provided with elongated openings therein for the reception of a threaded member or bolt, the openings in the washers permitting of their assuming the position upon the shank of the bolt so that they may be passed through an opening or aperture of sufficient size to permit of the passage of the bolt head and to then assume a right angular position, whereby reverse passage of the washers through the aperture is prevented.

The invention further includes novel means for closing the aperture by pressing inwardly the material surrounding the same to form a flange and to provide a seat for the reception of a beveled gasket, with an additional gasket and washers of relatively large size surrounding the seat and a nut upon the threaded end of the bolt for securing the closure in position.

The invention further includes the following novel details of construction, combination and arrangement of parts to be hereinafter more fully described and illustrated in the accompanying drawings.

In the drawings:—

Figure 1:
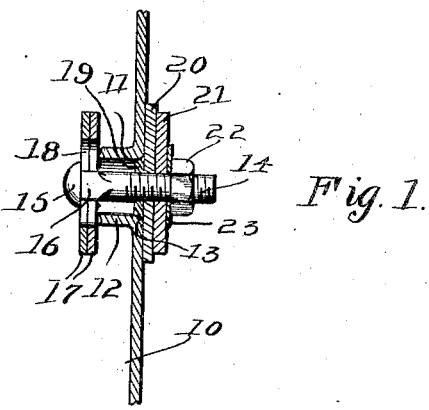
Figure 1 is a sectional view showing the device in position for use.
Figure 2:
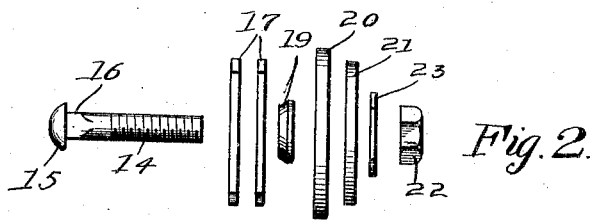
Fig. 2 is an elevation of the various parts separated in the order in which they are assembled.
Figure 3:
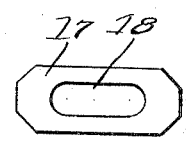
Fig. 3 is a plan view of one of the elongated washers or strips.

Referring to the drawings in detail, wherein like characters of reference denote corresponding parts, the numeral 10 indicates a fragmentary portion of a boiler or other receptacle having an opening therein as indicated at 11. This opening is made at the point of which the leak occurs, the material surrounding the opening being forced inwardly to provide a flange 12, the edges of which are ragged or rough, due to the tearing or splitting of the material as it is forced inwardly, one of the purposes of the invention being to utilize these roughened edges in a manner hereinafter apparent. By forcing the material surrounding the opening inwardly in the manner shown, there is provided a rounded or beveled seat 13.

The device which is used for closing the opening so as to prevent leakage therethrough includes a threaded member 14 shown in the form of a bolt having a head 15 of suitable shape and size. The threaded member is further provided adjacent the head with a squared portion 16. The opening 11 is of sufficient size to permit of the free passage of the head 15, so that the latter may be inserted upon the outside of the receptacle.

One or more washers 17 preferably formed of strips of flat metal and having elongated openings 18 therein are adapted to be placed upon the shank of the bolt adjacent the head 15 and over the squared portion 16. These washers are of substantially the same width as the diameter of the head, the openings 18 therein being of sufficient length to permit of their being diagonally positioned upon the shank of the bolt and in this position passed through the opening 11. After insertion through the opening 11 the washer 17 will then assume a position at right angles to the bolt, their length being sufficient to straddle the opening and prevent reverse passage therethrough. A beveled gasket 19 is then placed upon the shank of the bolt or threaded member 14 and positioned within the seat surrounding the opening 11. A relatively large washer 20 of suitable compressible material is then threaded upon the bolt for position against the outer wall 10 of the receptacle. Another washer 21 preferably of metal is positioned against the washer, while interposed between this washer and the securing nut 22 is a spring metal washer 23.

When the parts are securely adjusted in position the elongated washer 17 will be drawn tightly against the roughened edge of the flange 12 and the beveled gasket 19 forced into the seat, while the washer 20 will be tightly positioned against the outer wall of the receptacle. By positioning the washer 17 against this roughened edge of the flange 12 and by providing the squared portion 16 on the threaded member 14, the latter will be held against rotation, so that the closure may be easily and securely adjusted in position.

The invention is susceptible of various changes in its form, proportions and minor details of construction and the right is reserved to make such changes.

Having described the invention, what is claimed is:—

1. The combination with a receptacle provided with an aperture and a flange surrounding the aperture to define a seat, of a threaded member, a head upon one end of said member, an elongated element provided with an elongated opening to receive said member, whereby said element may be passed through the aperture, a beveled gasket surrounding the threaded member for position within said seat, relatively large washers upon said threaded member and a securing nut upon the end of the member.

2. The combination with a receptacle provided with an aperture and a flange surrounding the aperture to define a seat, of a threaded member, a head upon one end of said member, a squared portion provided upon said member adjacent said head, an elongated element provided with an elongated opening for position upon the squared portion of said member, said elongated element being of substantially the same diameter as the head of the threaded member, whereby said element may be passed through the aperture, a roughened or serrated edge with said flange for engagement with the elongated member, washers carried by the threaded member for position upon the opposite side of the aperture and a securing nut upon the threaded end of said member.

In testimony whereof I affix my signature.

JOSHUA H. WARNER.

Copies of this patent may be obtained for five cents each, by addressing the "Commissioner of Patents, Washington, D. C."